United States Patent
Chen

(10) Patent No.: US 6,819,551 B2
(45) Date of Patent: Nov. 16, 2004

(54) COMPUTER ENCLOSURE WITH PIVOTABLE HOOD

(75) Inventor: Yun-Lung Chen, Tu-Chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 225 days.

(21) Appl. No.: 10/128,098

(22) Filed: Apr. 22, 2002

(65) Prior Publication Data

US 2003/0151333 A1 Aug. 14, 2003

(30) Foreign Application Priority Data

Feb. 8, 2002 (TW) ........................................ 91201727 U

(51) Int. Cl.⁷ ................................................ G06F 1/16
(52) U.S. Cl. .................... 361/683; 361/679; 312/223.1; 312/244; 411/182
(58) Field of Search ............................... 361/680–687, 361/724–727, 741, 756; 70/159–162; 109/67–68; 312/215, 219, 223.1, 223.2, 244, 298; 220/4.02, 254, 255; 411/182, 549, 552; 364/708.1

(56) References Cited

U.S. PATENT DOCUMENTS

| | | | | |
|---|---|---|---|---|
| 4,909,579 A | * | 3/1990 | Liu | 312/223.2 |
| 5,713,647 A | * | 2/1998 | Kim | 312/223.2 |
| 5,995,363 A | * | 11/1999 | Wu | 361/679 |
| 6,351,373 B1 | * | 2/2002 | Le et al. | 361/683 |
| 6,570,755 B2 | * | 5/2003 | Curlee et al. | 361/683 |
| 6,665,178 B2 | * | 12/2003 | Curlee et al. | 361/687 |

OTHER PUBLICATIONS

Article "Lift Mechanism", IBM Technical Disclosure Bulletin, vol. 29, Issue 7, pp. 3012–3013, Dec. 1, 1986.*

* cited by examiner

Primary Examiner—Michael Datskovsky
(74) Attorney, Agent, or Firm—Wei Te Chung

(57) ABSTRACT

A computer enclosure includes a base (10), and a hood (20) pivotably attached to the base. The base includes a bottom wall (12), and a pair of side walls (14) extending from the bottom wall. A pair of posts (120) extends upwardly from front corners of the bottom wall. Each post defines a guiding groove (124) therein. The hood includes a top cover (22), a pair of side panels (24) extending from the top cover, and a pair of pivot mechanisms (28). Each pivot mechanism includes a pivot pin (286) movably received in the guiding groove of the corresponding post.

10 Claims, 4 Drawing Sheets

COMPUTER ENCLOSURE WITH PIVOTABLE HOOD

BACKGROUND OF THE INVENTION

1. Field of the Invention

The present invention relates to computer enclosures, and particularly to a computer enclosure having a base and a hood pivotable about the base.

2. Related Art

An electronic device such as a computer normally includes an enclosure for receiving and protecting internal electronic components and subassemblies. The enclosure can also protect other adjacent electronic devices from electromagnetic interference. An enclosure should be able to readily receive new or replacement electronic components and/or subassemblies therein. An enclosure that can be readily assembled and disassembled saves time and reduces costs.

Contemporary computers have a variety of enclosures. One kind of conventional enclosure, as disclosed in Taiwan Patent Application No. 89211639, includes a base and a hood attached to the base with bolts. It is time-consuming and laborious to attach the hood to the base by screwing down the bolts. Similarly, it is time-consuming and troublesome to detach the hood from the base by unscrewing the bolts. These difficulties are even more pronounced in mass production facilities. R educed efficiency increases costs of computers.

SUMMARY OF THE INVENTION

Accordingly, an object of the present invention is to provide a computer enclosure that includes a base and a hood pivotable about the base to facilitate installation and maintenance of electronic devices inside the enclosure.

To achieve the above-mentioned object, a computer enclosure in accordance with the present invention includes a base and a hood pivotably attached to the base. The base includes a bottom wall, and a pair of side walls extending from the bottom wall. A pair of posts extends upwardly from front corners of the bottom wall. Each post defines a guiding groove therein. The hood includes a top cover, a pair of side panels extending from the top cover, and a pair of pivot mechanisms. Each pivot mechanism includes a pivot pin movably received in the guiding groove of the corresponding post.

Other objects, advantages and novel features of the present invention will be drawn from the following detailed description of a preferred embodiment of the present invention with attached drawings, in which:

DETAILED DESCRIPTION OF THE PREFERRED EMBODIMENT

Figure 1:
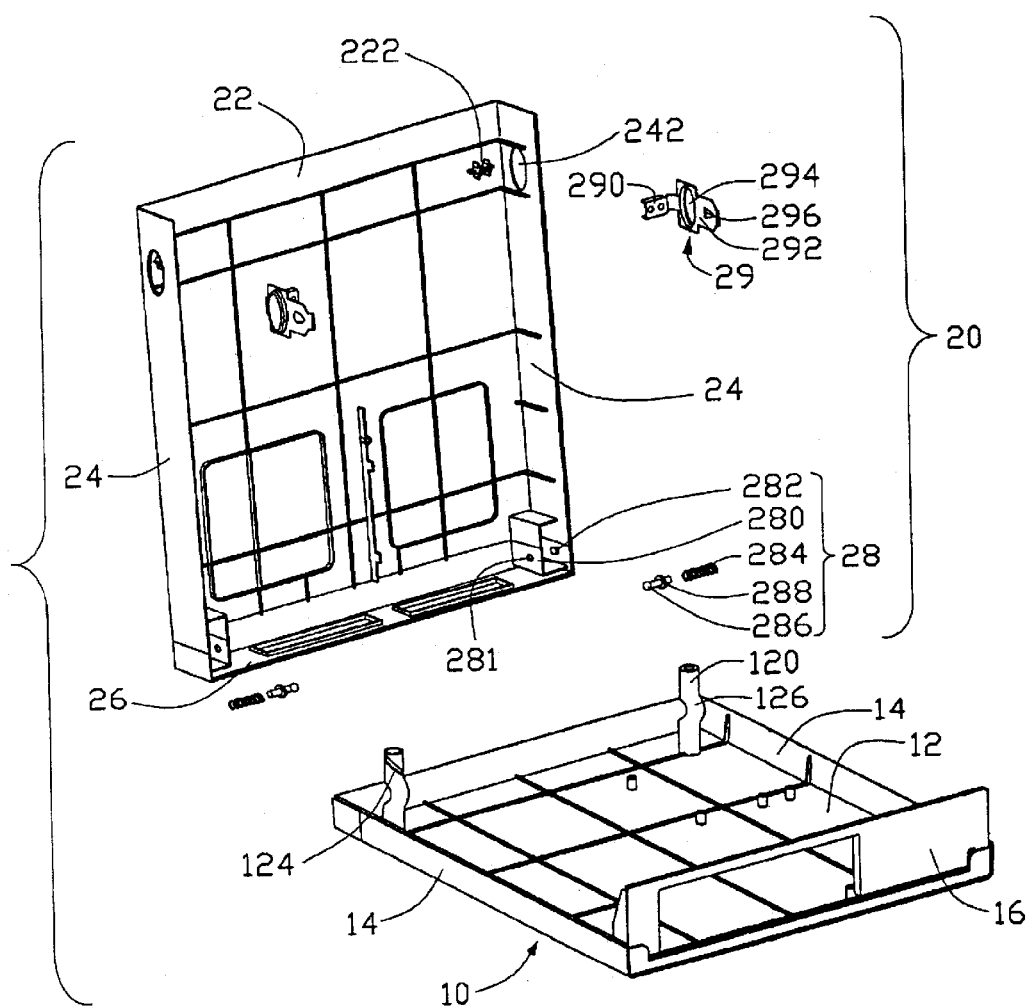
FIG. 1 is an exploded perspective view of a computer enclosure in accordance with the present invention.
Figure 2:
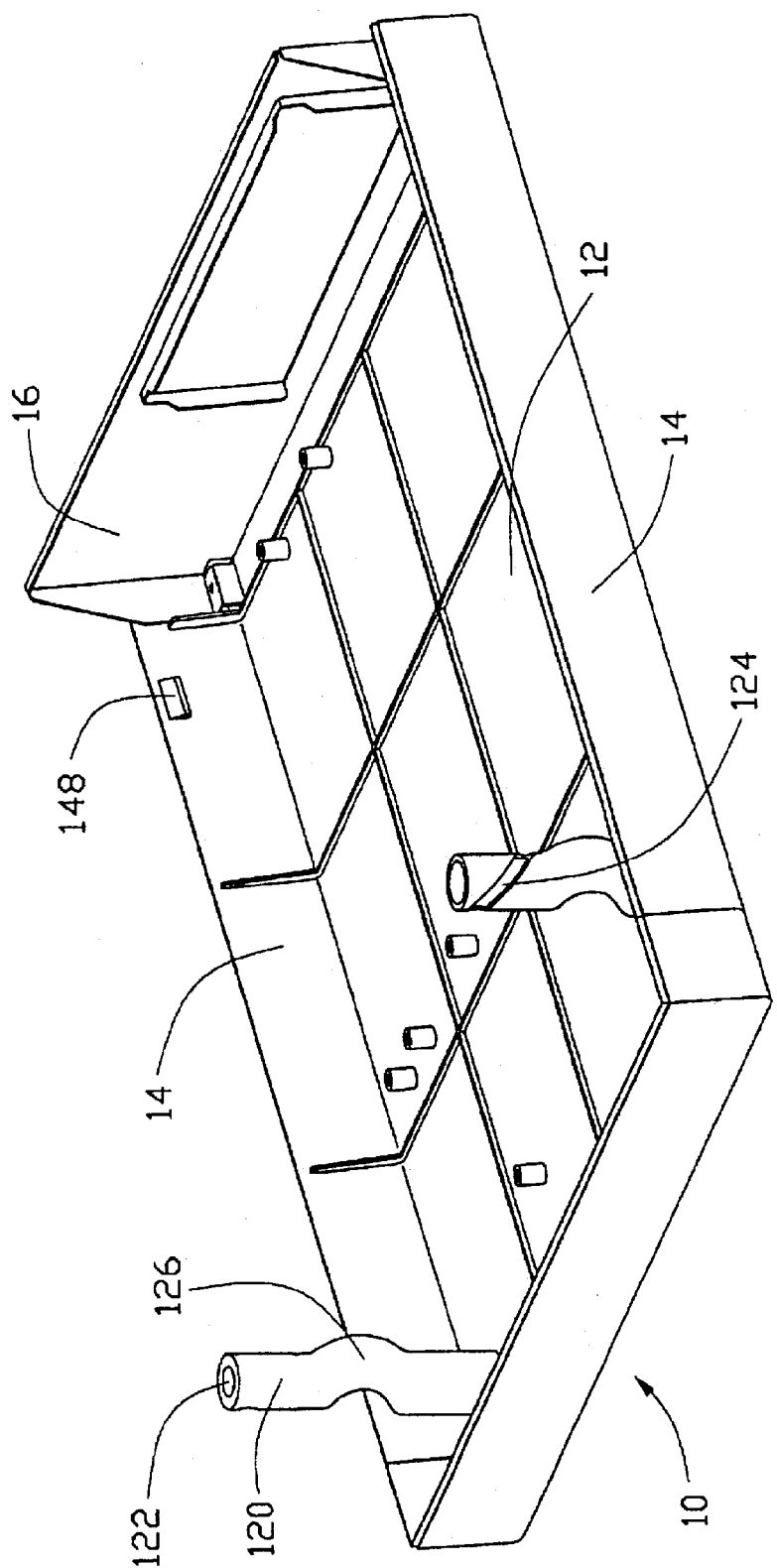
FIG. 2 is an enlarged perspective view of a base of the enclosure of FIG. 1, viewed from another aspect.

Referring to FIGS. 1 and 2, a computer enclosure in accordance with the present invention includes a base 10 and a hood 20 pivotably connecting to the base 20. The base 10 includes a bottom wall 12, a pair of side walls 14 extending from the bottom wall 12, and a rear wall 16 extending from the bottom wall 12 between the side walls 14. A pair of posts 120 extends upwardly from front corners of the bottom wall 12 respectively. Each post 120 has a curved portion 126 in a middle thereof. The curved portion is generally U-shaped, with a belly of the U-shape oriented toward the rear wall 16. A bore 122 is longitudinally defined in the post 120. A guiding groove 124 is defined in the post 120 near a top thereof, in communication with the bore 122. The guiding groove 124 generally faces the corresponding proximate side wall 14, and slants downwardly toward the rear wall 16. A shape of the guiding groove 124 is generally that of a segment of a spiral. A pair of blocks 148 is respectively formed on inner side surfaces of the side walls 14 near the rear wall 16. The posts 120 and the blocks 148 are thus generally disposed adjacent four corners of the base 10 respectively.

Figure 4:
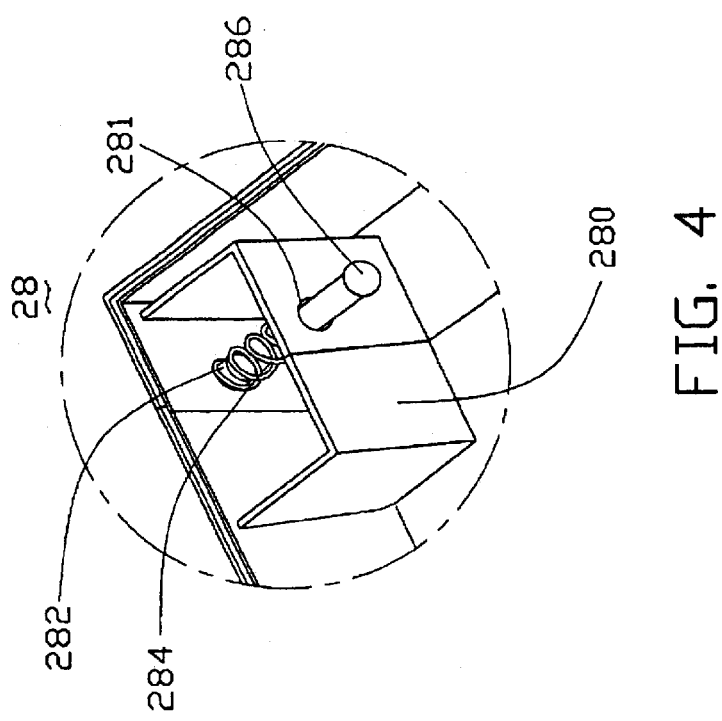
FIG. 4 is an enlarged view of a circled portion IV of FIG. 3.
Figure 3:
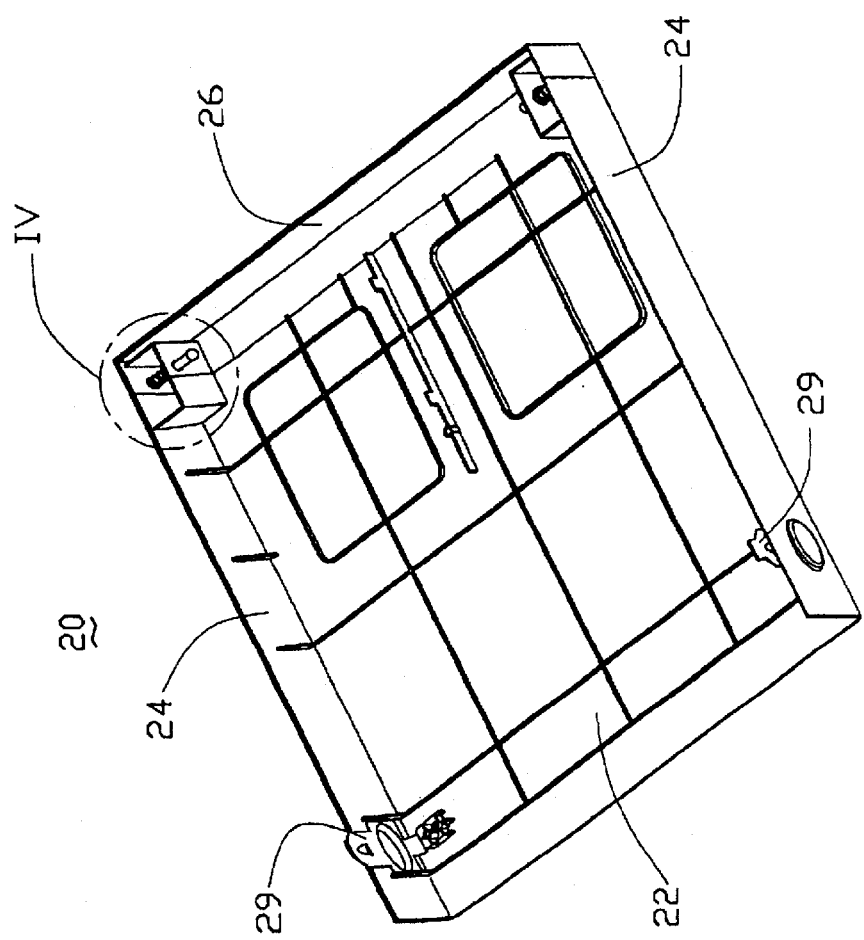
FIG. 3 is an enlarged perspective view of a hood of the enclosure of FIG. 1, viewed with the hood inverted.
Figure 5:
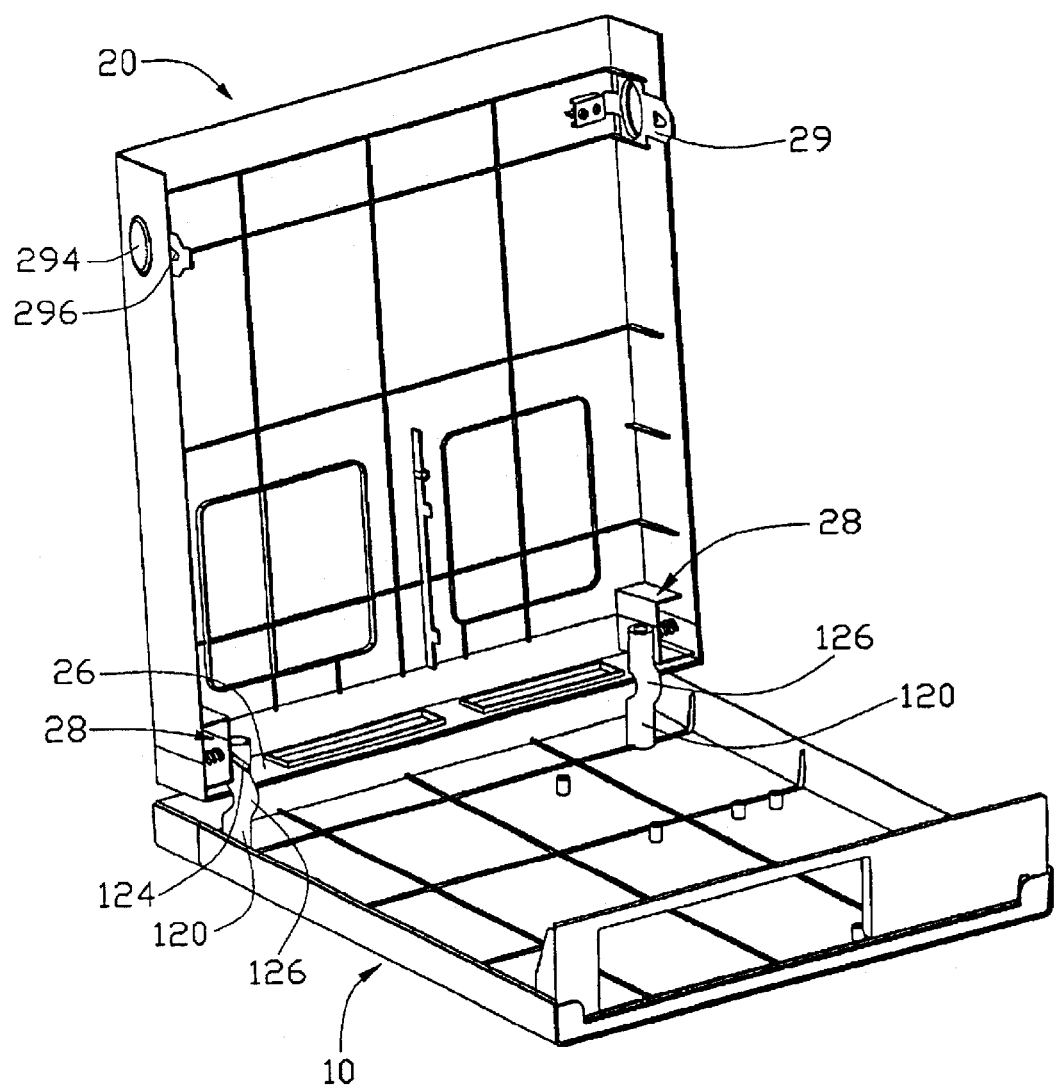
FIG. 5 is an assembled view of FIG. 1.

Referring also to FIGS. 3, 4 and 5 the hood 20 includes a top cover 22, a pair of side panels 24 extending from the top cover 22, a front panel 26 extending from the top cover 22 between the side panels 24, a pair of pivot mechanisms 28 respectively formed at opposite corners of the top cover 22 that are adjacent the front panel 26, and a pair of lock devices 29 attached at rear corners of the top cover 22 respectively. A pair of locating posts 222 inwardly extends from the rear corners of the top cover 22 respectively. A pair of openings 242 is respectively defined in the side panels 24, near the corresponding locating posts 222. Each lock device 29 includes a fixing portion 290 engaging with the corresponding locating posts 222, and a latch portion 292 extending generally perpendicularly from the fixing portion 290. A button 294 is outwardly stamped from the latch portion 292, for extending through the corresponding opening 242. An engaging protrusion 296 is outwardly formed on the latch portion 292, for engaging with the corresponding block 148 of the base 10 and thereby attaching the hood 20 to the base 10.

Each pivot mechanism 28 includes a generally U-shaped support member 280 extending from the top cover 22 and connecting with the corresponding side panel 24, a locating protrusion 282 extending perpendicularly inwardly from the side panel 24, a spring 284, a pivot pin 286, and a securing ring 288. An aperture 281 is defined in a portion of the support member 280 that is parallel to the side panel 24. The aperture 281 is aligned with the locating protrusion 282, and receives the pivot pin 286 therethrough. A longitudinal through hole (not labeled) is defined in the spring 284, and receives the locating protrusion 282 and the pivot pin 286 therein. The securing ring 288 is attached around the pivot pin 286, is actuated by the spring 284 to abut against the support member 280, and thereby fixes the pivot pin 286 in the aperture 281 of the support member 280. The pivot pin 286 can be pressed toward an outside of the top cover 22. When the pivot pin 286 is so pressed, the securing ring 288 compresses the spring 284.

Referring particularly to FIG. 5, in assembly of the computer enclosure, the pivot pins 286 of the pivot mechanisms 28 of the hood 20 are movably received in the guiding grooves 124 of the posts 120 of the base 10. The hood 20 is thus pivotable about the base 10. When the hood 20 is closed, the engaging protrusions 296 of the lock devices 29 of the hood 20 snappingly engage with the blocks 148 of the base 10. The buttons 294 of the lock devices 40 are received in the corresponding openings 242 of the base 10. The hood 20 is thereby removably fixed to the base 10. When the buttons 294 of the lock devices 40 are pushed inwardly, the engaging protrusions 296 of the lock devices 29 are disengaged from the blocks 148 of the base 10. The hood 20 is thereby rotatably released from the base 10. Thus, the hood 20 is readily rotated up from the base 10. The curved portions 126 of the posts 120 provide space to allow free rotation of the front panel 26 of the hood 20. The hood 20 allows ready access to an interior of the computer enclosure.

It is understood that the invention may be embodied in other forms without departing from the spirit thereof. Thus, the present example and embodiment are to be considered in all respects as illustrative and not restrictive, and the invention is not to be limited to the details given herein.

What is claimed is:

1. A computer enclosure comprising:
   a base comprising a pair of posts, each of the posts defining a guiding groove therein; and
   a hood comprising a pair of pivot mechanisms engaged with the base and a pair of lock devices engagable with the base to thereby movably fix the hood to the base, each of the pivot mechanisms comprising a pivot pin detachably attached to the hood and a spring, the sprint urging the pivot pin movably received in the guiding groove of a corresponding post of the base, whereby the hood is pivotable about the base.

2. The compute enclosure as claimed in claim 1, wherein each of the pivot mechanisms further comprises a support member defining an aperture therein, a locating protrusion aligned with the aperture, and a securing ring, the spring defining a through hole receiving the locating protrusion therein, the pivot pin extending through the aperture and being received in the through hole, the securing ring being attached to the pivot pin and actuated by the spring to abut against the support member.

3. The compute enclosure as claimed in claim 1, wherein each of the posts comprises a curved portion for facilitating rotation of the hood.

4. The compute enclosure as claimed in claim 1, wherein each of the lock devices comprises a fixing portion attached to the hood, and a latch portion engagable with the base.

5. The compute enclosure as claimed in claim 4, wherein the latch portion extends substantially perpendicularly from the fixing portion.

6. The compute enclosure as claimed in claim 4, wherein a button is formed at the latch portion, and the hood defines a pair of openings each receiving a corresponding button therein for facilitating disengagement of the latch portion from the base.

7. A computer enclosure comprising:
   a base comprising a bottom wall, a pair of side walls extending from the bottom wall, and a pair of posts extending from the bottom wall, each of the posts defining a guiding groove, each of the costs comprising a curved portion for facilitating rotation of the hood; and
   a hood engaged with the base, the hood comprising a top cover, a pair of side panels extending from the top cover, and a pair of pivot mechanisms, each of the pivot mechanisms comprising a pivot pin movably received in the guiding groove of a corresponding post.

8. The compute enclosure as claimed in claim 7, wherein each of the pivot mechanisms further comprises a support member extending from the top cover and connecting with a corresponding side panel, a locating protrusion extending from the side panel, a spring defining a through hole receiving the locating protrusion and the pivot pin therein, and a securing ring attached to the pivot pin and actuated by the spring to but against the support member.

9. The compute enclosure as claimed in claim 8, wherein an aperture is defined in the support member in alignment with the locating protrusion, and the pivot pin extends through the aperture.

10. A computer enclosure comprising:
    a base comprising at least one upstanding post defining an obliquely extending guiding groove therein; and
    a hood comprising pivot mechanism including a pivot pin received in the guiding groove, and a spring urging said pivot pin receiveably engaged within said guiding groove; wherein
    said pivot pin is moved both upwardly and horizontally relative to the base along said guiding groove when said hood is moved from a horizontal locked position to a vertical open position.

* * * * *